MEANS FOR CONTROLLING VHF LOOP GAIN OF A FEEDBACK AMPLIFIER

Filed Jan. 14, 1963

3,191,128

MEANS FOR CONTROLLING VHF LOOP GAIN OF A FEEDBACK AMPLIFIER

Keith Lamont, London, England, assignor to Associated Electrical Industries Limited, London, England, a British company Filed Jan. 14, 1963, Ser. No. 251,337
Claims priority, application Great Britain, Feb. 15, 1962, 5,894/62
3 Claims. (Cl. 330—103)

This invention relates to amplifiers with negative feedback, particularly to amplifiers having inductive output coupling means, and aims at providing an improved feedback network the stable operation of which is less dependent upon the constructional tolerances of transformers, or the like apparatus in the amplifier output circuit which have conventionally been used for deriving feedback signals. Even where the input and output impedance requirements of an amplifier are stringent, the invention makes it possible to use mass produced transformers, while also maintaining great stability and avoiding excessive phase shift of the feedback signal, particularly at high out-of-band frequencies, for instance in the region extending from the highest working frequency to a frequency which is one or two decades higher.

Accordingly, this invention resides in a feedback arrangement for an amplifier supplying a load through a transformer wherein a frequency sensitive directional coupler is provided between the amplifier and the transformer with said directional coupler superimposing upon feedback derived by the transformer a proportionally larger percentage of the overall feedback signal as the frequency of the signal increases.

A low-pass filter is conveniently provided to prevent transmission of the feedback signals from the coupler to the transformer.

The coupler may be earthed through an impedance, it may be symmetrical and of the hybrid transformer kind.

More details will become apparent and the invention will be better understood from the following description referring to the accompanying drawings, in which.

Figure 1:
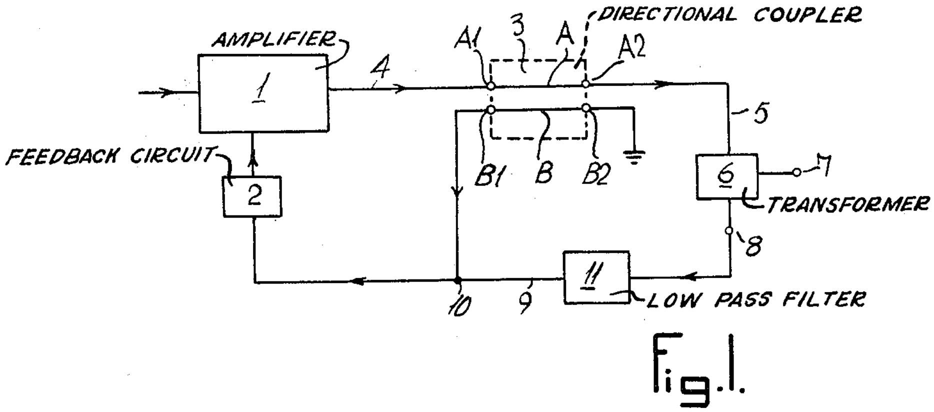
FIG. 1 shows diagrammatically a circuit arrangement according to the invention.

Referring to FIG. 1 an amplifier 1 is connected through a conductor or line 4 to a directional coupler 3, which may be symmetrical, and the coupler is further connected through a line 5 to a transformer 6, which has an output terminal 7 for connection to a load. A feedback signal is supplied from point 8 of the transformer through a low pass filter 11 and a conductor 9 to a feedback circuit 2 of the amplifier 1.

The coupler comprises a transmission line A connected between terminals A1, A2 of the conductors 4, 5, and another transmission line B between terminals B1, B2 of a line having one end at B1 connected at 10 to the conductor 9 and having the other end at B2 earthed, preferably through an impedance.

The coupler is of a conventional construction, described for instance, in the article "Coupled Transmission Lines as Symmetrical Directional Couplers," by G. E. Monteath, published in Proc. I.E.E. Part B, May 1955, pages 383–392.

The frequency response of the feedback circuit through the coupler 3 may be varied by varying the impedance of the circuit presented to terminal B1.

The filter 11 is tuned to prevent the high out-of-band feedback signals, derived from terminal B1, straying to the transformer 6.

Figure 2:
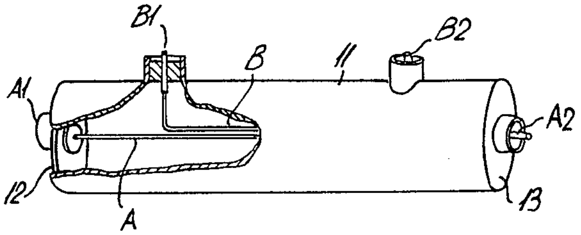
FIG. 2 shows by way of example a directional coupler suitable to be used in such a circuit.

FIG. 2 shows an exemplary construction of the coupler 3, consisting of a metal tube 14 closed by end plates 12, 13 of metal. The terminals A1, A2 comprise, in this case, co-axial sockets mounted in the plates 12, 13, with the centre conductors of the sockets supporting the straight conductor A. The straight conductor B is parallel to conductor A and has end portions bent at right-angles joined to terminals B1, B2 of similar sockets which are held in holes of the metal tube 1.

Figure 3:
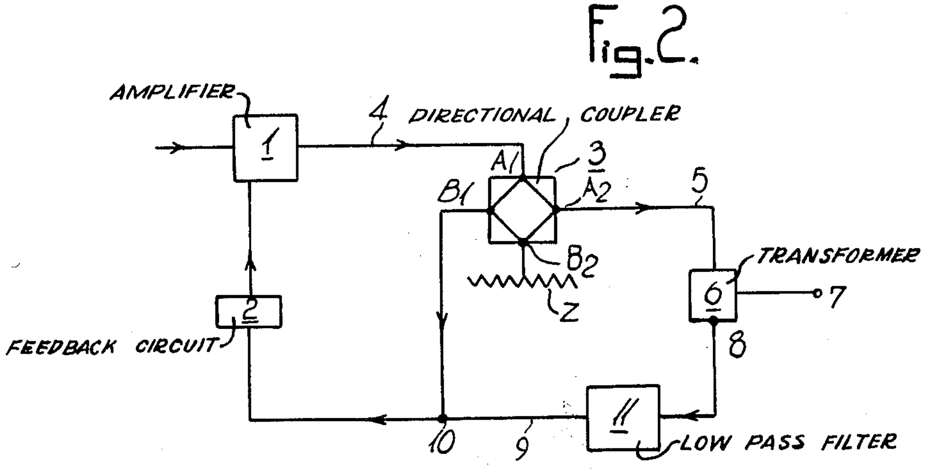
FIG. 3 shows the arrangement of FIG. 1 in a more conventional fashion.

As indicated in FIG. 3 the directional coupling 3 operates in the well known hybrid transformer fashion. The output terminal A2 is conjugate with the feedback terminal B1, and an advantageous bridge feedback, known per se, is secured, so that the effect of the feedback through the directional coupling is independent of a load connected to terminal 7.

Modifications are possible without departing from the invention. The amplifier may be of any known type, comprising thermionic valves, or semi-conductor devices, for instance. A ceramic material, or a ferrite may be used in the coupler to provide increased coupling effect dependent upon the signal frequency.

What I claim is:

1. In a feedback arrangement, the combination of a transformer, an amplier connected to said transformer to supply a load therethrough, means for supplying a feedback signal from said transformer to said amplifier, a frequency sensitive directional coupler between said amplifier and said transformer, said directional coupler superimposing upon the feedback derived by said transformer a proportionally larger percentage of the overall feedback signal as the frequency of the signal increases.

2. An arrangement as claimed in claim 1, wherein the coupler is symmetrical.

3. An arrangement as claimed in claim 1, wherein the coupler is of a hybrid kind.

References Cited by the Examiner

UNITED STATES PATENTS 2,017,180 10/35 Cowan ............... 333—11

OTHER REFERENCES

Monteath: "Coupled Transmission Lines as Directional Couplers," The Proc. of the Institution of Electrical Engineers, Part B, May 1955, pages 383–392.

ROY LAKE, *Primary Examiner.*